Feb. 1, 1938. F. E. RICE 2,107,165
TAP CONSTRUCTION
Filed April 9, 1936 2 Sheets-Sheet 1
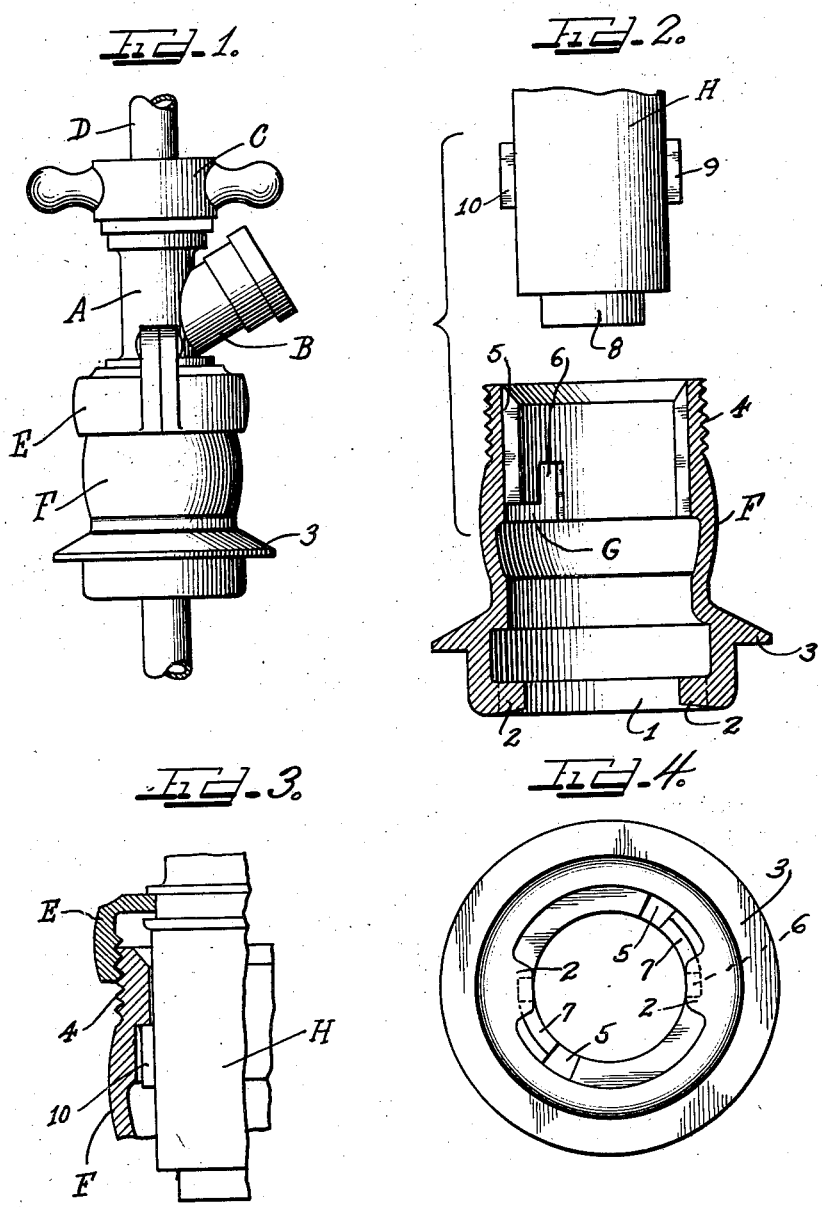
Inventor
FRANK E. RICE.
by Charles T. Wills Attys Feb. 1, 1938.   F. E. RICE   2,107,165
TAP CONSTRUCTION
Filed April 9, 1936   2 Sheets-Sheet 2
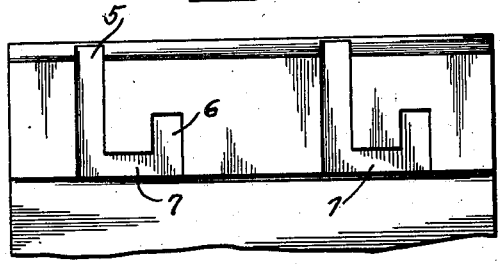
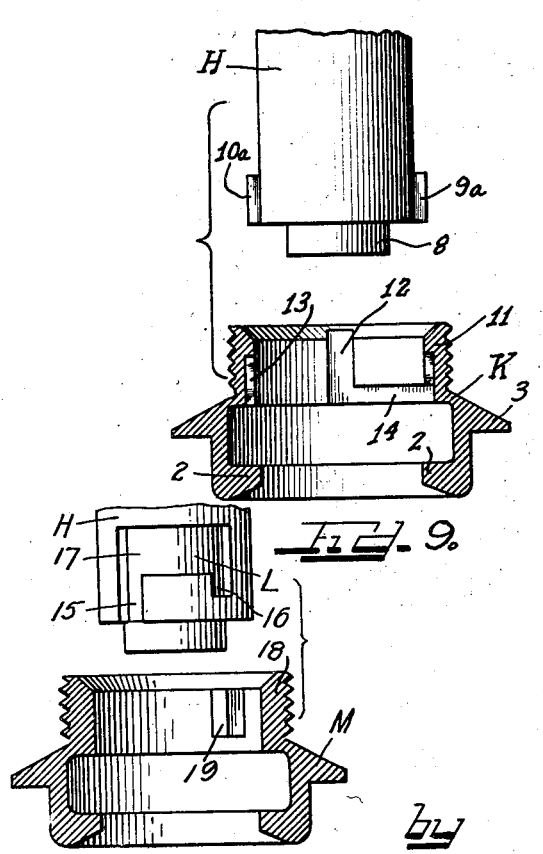
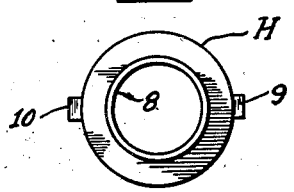
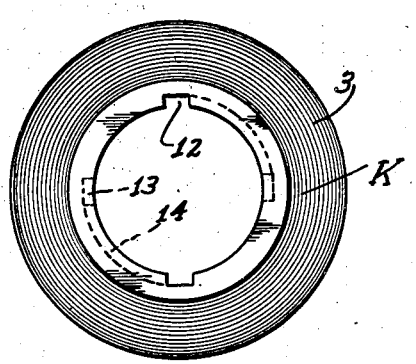
Inventor
FRANK E. RICE.
by Charles M Gill Attys.

Patented Feb. 1, 1938

2,107,165

UNITED STATES PATENT OFFICE 2,107,165

TAP CONSTRUCTION

Frank E. Rice, Detroit, Mich., assignor to American Tap Bush Company, Detroit, Mich., a corporation of Delaware Application April 9, 1936, Serial No. 73,395

5 Claims. (Cl. 285—40)

The present invention relates to tap construction and more particularly to the construction of a tap of the "Peerless" type whereby, under normal use of the tap, the coupling is prevented from disconnection from the tap body to eliminate loss of a coupling in use.

Experience has demonstrated that beer barrel taps, and taps of like nature, utilizing separable couplings for connecting the taps to tap bushes, often, when a tap is disconnected from a bush, the couplings are removed from the tap body and lost thus necessitating replacement of the couplings before the taps can again be used.

The present invention has for an object, therefore, the construction of a tap of such nature that the coupling may be moved relatively to the tap body for ready connection to and disconnection from a tap bush, and yet at the same time prevented from separation from the tap body except under abnormal conditions.

Another object of the present invention is to provide a tap body and coupling with cooperating lug and slot means of such character as to permit the necessary axial relative movement between these parts for attaching a tap to and removing it from a bush, and yet at the same time preventing angular movements, one with respect to the other, of such nature as will permit the parts to be readily separated.

A further object of the present invention is to provide a method of preventing the loss of the couplings from the tap bodies, of beer barrel taps, of the "Peerless" type.

Generally speaking the present invention contemplates the formation, in the coupling ring and cooperating part of the tap bush body, of lug and slot means with the slot means being of substantially U-shape, with legs of unequal length, and the portion connecting the legs being circumferential of the member in which it is formed. The parts are brought together with the longer legs of the slots engaging certain of the lugs on the other cooperating member and the parts moved axially until the lug means engages the circumferential portion of the slot means whereupon relative rotative movement is imparted to the parts until the lug means register with the shorter slot legs whereupon relative axial movement in the opposite direction is effected, to thereby retain the lug means in engagement with the shorter legs of the slot means during normal use of the tap. The parts are so constructed that sufficient movement of the coupling is possible, by means of the clamp ring of the tap, to enable ready connection to or disconnection from a tap bush, of a tap embodying the present invention.

The accompanying drawings illustrate an embodiment of the present invention and the views thereof are as follows:

Figure 1 is an elevational view of a tap of the "Peerless" type, constructed in accordance with the principles of the present invention, showing a portion of a pump tube as usually clamped in such a tap.

Figure 2 is a view, partially in elevation and partially in axial section, of cooperating tap body and coupling parts, showing the tap body portion provided with lug means and a coupling provided with the U-shaped slot means of the present invention.

Figure 3 is a fragmental view, partially in elevation and partially in section illustrating the engagement with the lug means on a tap body with the shorter leg of the slot means formed in the coupling, when the coupling has been moved by the clamp ring in a direction to disconnect the tap from or connect it to a bush. In other words Figure 3 shows the relationship of the tap body and coupling when the coupling has been loosened and further shows that under such conditions there is sufficient connection between the clamping ring and the coupling to prevent loss of the coupling from the tap.

Figure 4 is a bottom plan view of the coupling of Figure 2.

Figure 5 is a development of the interior of a coupling provided with two U-shaped slots for cooperating with two lugs on the corresponding tap body.

Figure 6 is a view similar to Figure 2 except that the coupling illustrated is a regular coupling, of the "Peerless" type.

Figure 7 is an end view of the lower extremity of the tap body part provided with oppositely disposed lugs.

Figure 8 is a top plan view of the coupling of Figure 6, showing in dotted lines the angular displacement of the shorter leg of the slot and also the circumferential portions of the slot.

Figure 9 is a view similar to Figures 2 and 6, wherein the slot means are formed on the tap body and the lug means formed on the coupling.

The drawings will now be explained.

The tap illustrated in Figure 1 includes the usual tap body A having a lateral extension B for an air or gas hose connection, the usual top nut C for clamping a washer, retained within the body A, about the pump tube D for clamping it in the tap. There is also shown a clamping ring E which is so connected to the tap body as to be relatively rotatable thereon and also capable of limited axial movement, but otherwise irremovably carried by the body.

The coupling F is of the elongated axial length usually employed to position the nut C far enough above the chime of the beer barrel to permit ready connection of the tap to or disconnection from a tap bush, without injury to the fingers of the operator.

The coupling F is provided, at its lower end, with an opening 1 into which project oppositely disposed lugs 2 for cooperating with a slotted flange on a tap bush, for connecting the tap to the bush with a bayonet joint connection. Formed as a part of the coupling is an outwardly extending annular flange 3 which, when the tap is connected to a bush, engages the surface of the barrel surrounding the bush and thus tends to stabilize the tap and its connected tube against tilting movement.

The upper extremity of the coupling is exteriorly threaded at 4 for cooperating with interior threads on the clamping ring E, as is well understood in the art.

The interior of the upper end of the coupling F is, in the present instance, provided with two circumferentially spaced slots indicated generally at G which include axially extending legs 5 and 6, of unequal length which legs are connected by a circumferential portion. The longer legs 5 open through the upper end of the coupling while the upper ends of the shorter legs 6 terminate inwardly, axially, of the upper end of the coupling.

The tap body portion H which receives the coupling F has at its lower extremity the usual end cylindrical projecting part 8 for receiving a washer which is clamped between the part 8 and a tap bush, when the tap is applied to a bush. The tap body part H is also provided with diametrically opposed lugs 9 and 10 which are herein illustrated as being of greater axial length than radial thickness. The radial thickness of the lugs 9 and 10 is slightly less than the depth of the slot G.

The lengths of the longer legs 5 of the slot means and of the cooperating lugs are so related that when a coupling is attached to its tap body, and the lugs in engagement with the shorter legs 6, the threaded engagement of the clamping ring E with the coupling F is maintained.

The coupling K, illustrated in Figures 6 and 8, is, in all respects, the same as the coupling F, heretofore described, except that its axial length is less.

The coupling K has the oppositely disposed lugs 2 for connection to a tap bush in bayonet joint style, the outwardly extending annular stabilizing flange 3, and a neck 11 which is exteriorly threaded to threadedly engage the coupling ring of a tap. Formed in the interior of the neck 11, of this coupling, are U-shaped slots G, of the same character as heretofore described, with longer legs 12 and shorter legs 13, with the legs of a slot being connected by a circumferential portion 14. As illustrated the circumferential portion 14 of the coupling K is slightly greater than the circumferential portion 7 of the slot G of the coupling F. This, however, is a matter of design or choice as the circumferential portions of the slots of either coupling might be of the same or different lengths.

Because of the fact that the axial over-all dimension of the coupling K is less than that of the coupling F, the corresponding tap body portion H is provided with lugs 9a and 10a adjacent the extremity of the tap bush portion H and with the lower ends of the lugs in register with the lower end of the tap bush portion H.

In connecting either the bush F or the bush K, to its corresponding tap body part H, the longer legs 5 or 12, as the case may be, are caused to pass over the lug means on the tap body part until the upper end of the coupling is in position to be engaged by the clamping ring E whereupon the clamping ring E is rotated to move the coupling axially along the tap body part H upwardly from the lower extremity of this part until relative axial movement between the coupling and clamping ring reaches its limit in this direction. When the coupling and clamping ring have been threaded together as described the upper ends of the lugs are in register with the circumferential portions 7 or 14 of the slots G, thereupon the clamping ring and coupling together are given rotative movement on the tap A, from left to right as viewed in Figures 2, 5, and 6, until the lugs strike the farther boundaries of the short legs 6 or 13, thereupon the clamping ring is rotated in opposite direction to move the coupling F towards the lower end of the tap body H which movement continues until the upper ends of the lug means engage the closed tops of the slots 6 or 13 whereupon stopping axial movement of the coupling. The relative position of the parts, at this time, is illustrated in Figure 3.

The extent of movement of the coupling, towards the lower extremity of the tap body part H, in the manner just described, is sufficient to lower the lugs 2 of the coupling far enough beyond the lower end of the tap body portion H as to readily engage the tap with a tap bush for connection to the bush in the usual manner. After the coupling has been connected to the tap bush, and rotated to make a bayonet joint connection therewith, the clamping ring E is rotated in the opposite direction to move the coupling upwardly along the tap body and also move the tap body downwardly to effectively seal the tap to the bush. When it is desired to disconnect a tap from a bush, the clamping ring is rotated in the direction necessary to lower the coupling to its limit of movement as determined by engagement of the lug means with the shorter legs of the slot means. Normal use of the tap may thus be carried on indefinitely without any likelihood whatsoever of disconnection of the coupling from the tap.

To remove a coupling from a tap, the tap is of course disconnected from a bush and the tube freed from the tap, whereupon the clamping ring is rotated in a direction to draw the coupling upwardly to its limit of movement whereupon the coupling and clamping ring are given rotative movement, on the tap A, in the reverse direction, to thus move the lugs through the circumferential portions 7 or 14 of the coupling into register with the longer legs 5 or 12 of the coupling whereupon by rotation of the clamping ring E in the opposite direction the coupling may be disconnected from the clamping ring and removed from the tap body portion F, for repair, or replacement of the washer carried on the extremity 8 of the tap body portion, or for any other reason.

In the form of the invention illustrated in Figure 9 the slot means L are formed in the tap body portion H with a longer leg 15, a shorter leg 16 and a circumferential connecting portion 17. Necessarily the slot means L, in this form of the invention, must be inverted, so that the longer leg 15 of the slot means open through the lower extremity of the tap body portion H.

The coupling M, which is illustrated as of the shorter type, such as the coupling K, has, on the interior of its neck 18 interiorly projecting lug means 19 adapted to cooperate with the slot means L on the tap body portion H. In applying the coupling M, in this form of the invention, lug means 19 are brought into register with the longer leg 15 of the slot means, the clamping ring is then threaded to the neck 18 and the coupling drawn upwardly along the tap body part H until the upper end of the lug means 19 strikes the bottom, or in this case, the top, of the circumferential portion 17 of the slot means whereupon the clamping ring and coupling are given rotative movement until the lug means 19 align with the shorter leg 16 whereupon the clamping ring is then unscrewed to lower the coupling for connection to a tap bush. In this form of the invention the lower ends of the lug means 19 engage the lower end of the leg 16 of the slot L and thus prevent disconnection of the coupling from the tap.

It will be readily observed that the present invention provides a simple and very effective manner of connecting couplings to tap bodies, of the "Peerless" type in such manner that the coupling may be readily movable along the tap body for connection to or disconnection from a tap bush, and assuring that the coupling will remain on the tap body at all times, under normal operation of the tap.

It will be observed that the method of the present invention contemplates the construction of a tap, of the "Peerless" type, wherein the coupling and cooperating tap body portion are formed with engaging lug and slot connections of such nature as to permit ready application of a coupling to a tap body or ready removal of the coupling from the body, and also forming the part so that during normal operation separation of the coupling from the tap body is prevented.

The invention has been described herein more or less precisely as to details, yet it is to be understood that the invention is not to be limited thereby, as changes may be made in the arrangement and proportion of parts, and equivalents may be substituted, without departing from the spirit and scope of the invention.

The invention is claimed as follows:

1. In a tap construction including a pair of telescopable and separable clamp members provided with opposed means adapted to clamp a member interposable therebetween, and a member rotatably engaging one of said pair of members and threadedly engaging the other of said pair of members arranged rotatable to produce relative axial movement of said pair of members to advance them to clamping position in one direction of movement and to retract them to clamp release position in the other direction of movement to provide for separation of said pair of members in the latter position, cooperable locking means formed on said pair of members to retain them in assembled relation for removal from the clamped member as a unitary assembly when said rotatable member has been turned to retract said pair of members to clamp release position, said pair of members being relatively rotatable to unlocked position only while in the advanced position.

2. In a tap construction including a pair of telescopable and separable members provided with opposed means adapted to clamp a member interposable therebetween, and a member rotatably engaging one of said pair of members and threadedly engaging the other of said pair of members arranged rotatable to produce relative axial movement of said pair of members to advance them to clamping position in one direction of movement and to retract them to clamp release position in the other direction of movement to provide for separation of said pair of members in the latter position, means to lock said pair of members in assembled relation while they are in the clamp releasing position whereby the tap construction is adapted to be removed from the clamped member as a unitary assembly, said locking means comprising cooperable lock elements carried by said pair of members and arranged relatively movable to unlocking position only while said pair of members are in their advanced position.

3. In a tap construction including a pair of telescopable and separable clamp members provided with opposing means adapted to clamp a member interposable therebetween and means to cause relative axial movement of said pair of members to advance them to clamping position in one direction of movement and to retract them to clamp release position in the other direction of movement to provide for separation of said pair of members in the latter position, means to retain said pair of members in locked relation to each other when in their clamp release position whereby said pair of members are adapted to be removed in their locked relation from the clamped member, said locking means comprising cooperable lock elements carried by said pair of members and arranged movable to lock releasing position only while said pair of members are in their advanced position.

4. In a tap construction including a pair of telescopable and separable clamp members provided with opposing means adapted to clamp a member interposable therebetween and means to cause relative axial movement of said pair of members to advance them to clamping position in one direction of movement and to retract them to clamp release position in the other direction of movement to provide for separation of said pair of members in the latter position, means to retain said pair of members in locked relation to each other while in their clamp release position whereby said pair of members are adapted to be removed in their locked relation from the clamped member, said locking means comprising an outstanding member carried by one of said pair of members and adapted to enter a bayonet slot formed in the other of said pair of members, said locking means being movable to unlocking position only while said pair of members are in advanced position.

5. In a tap construction including a pair of telescopable and separable first and second members provided with opposed means adapted to clamp a member interposable therebetween, and a member rotatably engaging the first of said pair of members and threadedly engaging the second of said pair of members arranged rotatable to produce relative axial movement of said pair of members to advance them to clamping position in one direction of movement and to retract them to clamp release position in the other direction of movement to provide for separation of said pair of members in the latter position, means to lock said pair of members in assembled relation while they are in clamp releasing position whereby the tap construction is adapted to be removed from the clamped member as a unitary assembly, said lock means comprising means defining a bayonet slot on said first member and an inwardly extending tongue on the said second member and arranged relatively movable to unlock said pair of members only while said pair of members are in their advanced position.

FRANK E. RICE.